United States Patent [19]
Savage et al.

[11] 3,856,060
[45] Dec. 24, 1974

[54] TREE HARVESTING SYSTEM

[76] Inventors: Donald D. Savage, 2883 Cobb St.;
Maurice T. Mills, 108 Margaret Ave., N.E., both of Marietta, Ga. 30060

[22] Filed: July 27, 1973

[21] Appl. No.: 383,115

[52] U.S. Cl. ...... 144/34 B, 56/DIG. 2, 144/309 AC
[51] Int. Cl. ............................................. A01g 23/08
[58] Field of Search ............ 144/3 R, 3 D, 2 R, 2 Z, 144/34 R, 34 B, 34 E, 309 AC; 56/DIG. 2

[56] References Cited
UNITED STATES PATENTS

| | | | |
|---|---|---|---|
| 3,460,594 | 8/1969 | Burkhalter | 144/309 AC |
| 3,475,886 | 11/1969 | Hart | 56/DIG. 2 |
| 3,640,322 | 2/1972 | Allen | 144/3 D |
| 3,643,709 | 2/1972 | McColl | 144/309 AC |

FOREIGN PATENTS OR APPLICATIONS

| | | | |
|---|---|---|---|
| 138,419 | 12/1960 | U.S.S.R. | 144/309 AC |

*Primary Examiner*—Andrew R. Juhasz
*Assistant Examiner*—W. D. Bray
*Attorney, Agent, or Firm*—B. J. Powell

[57] ABSTRACT

A tree harvesting method for selectively thinning trees from a plantation stand in which the trees are arranged in a first series of parallel rows and a second series of parallel rows oriented parallel to the first series of rows which includes felling the trees and forming bunching stacks between adjacent rows of the first series of rows. The trees in the bunching stacks are delimbed and topped. The bunching stacks are moved to an access lane through the timber stand and combined to form loading stacks along the edges of the access lane. As the felled trees are moved through the stand, they are always maintained in an upright position.

13 Claims, 8 Drawing Figures

TREE HARVESTING SYSTEM

BACKGROUND OF THE INVENTION

As timber is cut, need has dictated replanting of the cut timber. This has resulted in the advent of tree plantations in which the trees are planted in rows with the trees being planted on a prescribed spacing usually 6 × 8 foot centers. Considerable study has been devoted to this plantation growing system to determine the maximum yield of wook. Such studies have indicated that it is desirable to selectively thin the plantation trees after a certain period of time to allow the remaining timber to grow longer before harvesting. One desirable arrangement is to harvest every other tree in the stand after a growing period of about ten years to thin the stand and then harvesting the remaining trees after another ten year growing period.

In order for such a plantation growing technique to be successful, however, it is necessary to carry out the thinning operation so as to incur minimum damage to the remaining trees of the stand left to grow further. The prior art harvesting techniques have had difficulty in carrying out this thinning operation without significant damage to the remaining trees in an economical manner.

SUMMARY OF THE INVENTION

These and other problems and disadvantages associated with the prior art plantation thinning techniques are overcome by the invention disclosed herein by providing a technique which incurs minimal damage to the remaining trees of the stand while at the same time being economical. Such techniques require a minimum amount of both operating personnel and equipment.

The method contemplates the use of felling and transporting machines which have a width less than the widest spacing between the rows of trees. Such system includes the steps of felling the trees lying on diagonals running through the stand so that very other tree is felled. Such felled trees with the branches thereon are laid on the ground between the rows having the widest spacing in stacks of a predetermined number. The felled stacks of trees are then delimbed and topped.

The delimbed and topped stacks are then raised to a substantially vertical position and transported to a diagonally extending access lane formed by removing trees along three adjacent diagonals. The delimbed and topped stacks are laid in loading stacks along the edges of the access lane so that the longitudinal axes of the trees in the loading stacks are generally parallel to the diagonals of the access lane.

The log transporting vehicle is then moved down the access lane while the loading stacks are loaded thereonto.

These and other features and advantages of the invention will become more fully understood upon consideration of the following specification and accompanying drawings wherein like characters of reference designate corresponding parts throughout the several views and in which:

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
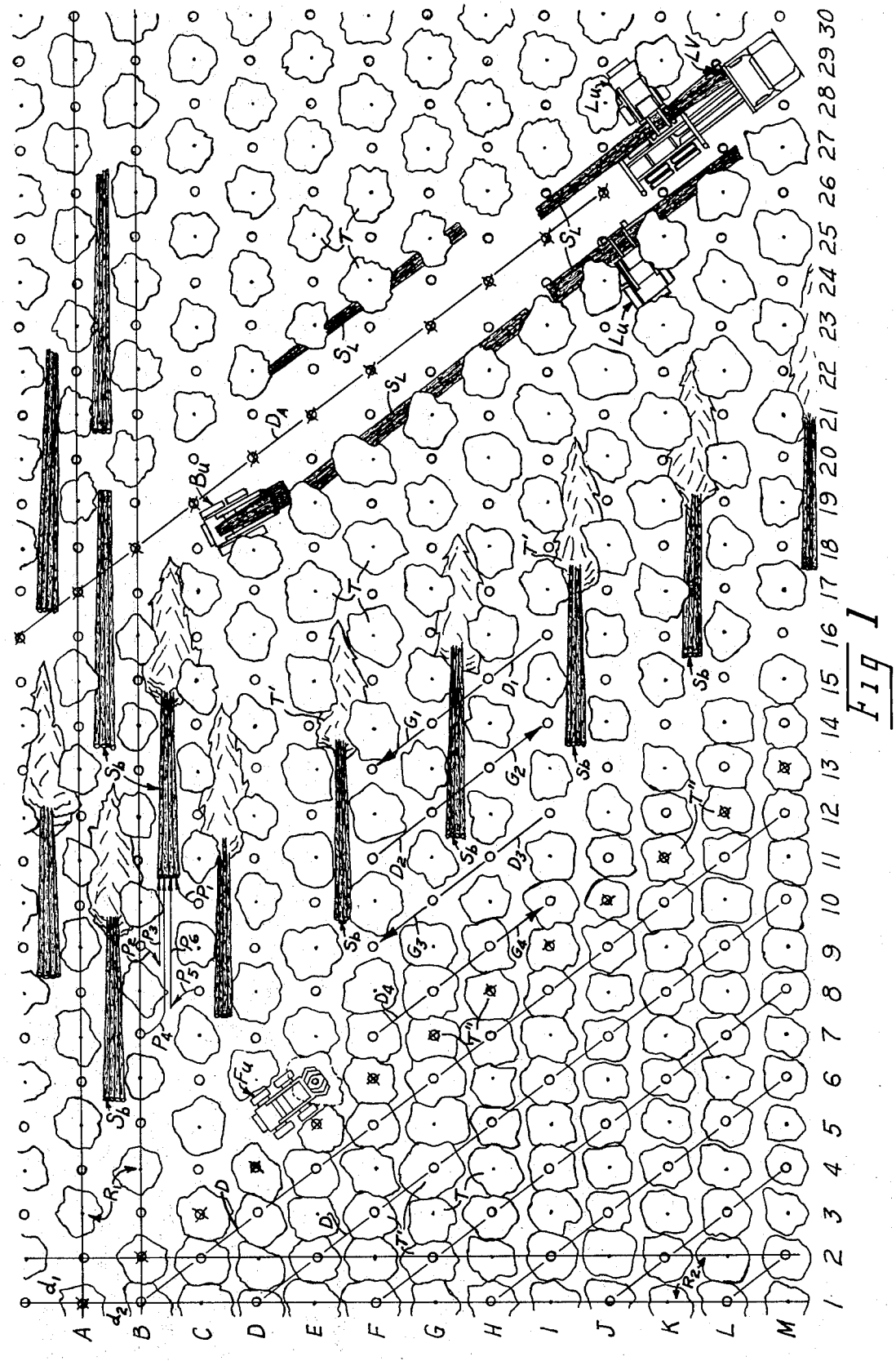
FIG. 1 is a schematic representation of a timber plantation being thinned according to the invention.

Referring to FIG. 1, a typical plantation stand of trees is shown schematically. It will be seen that the trees are arranged in substantially parallel rows $R_1$ in a first direction with rows $R_1$ spaced a first prescribed distance $d_1$ apart and also in substantially parallel rows $R_2$ in a second direction generally normal to the first direction with rows $R_2$ spaced a second prescribed distance $d_2$ apart. The result, then, is that the trees are on centers of first distance $d_1$ by second distance $d_2$. The usual practice is to have distance $d_1$ approximately 8 feet and distance $d_2$ approximately 6 feet. After a certain period of time, it is desirable to thin the timber stand by removing every other tree. Those trees to be removed are labelled T' in FIG. 1 and those trees to remain are labelled T.

Figure 2:
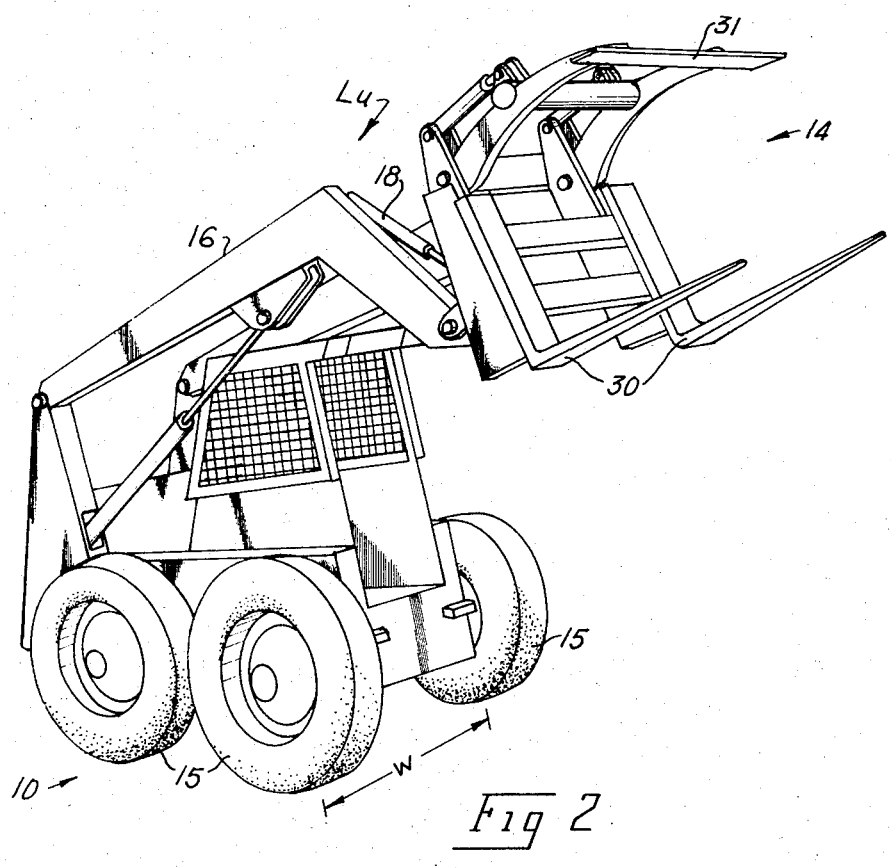
FIG. 2 is a perspective view illustrating a prime mover for use in carrying out the invention.

The method of this application uses a prime mover 10 seen in FIG. 2 with a tree shear attachment 11, a buncher grapple attachment 12, and fork grapple attachment 14. While a variety of prime movers 10 may be used, the width w of such prime movers 10 must be less than the greater of distances $d_1$ or $d_2$ and also have a very short turn radius in which to maneuver between the rows $R_1$ and $R_2$ as will become more apparent. A satisfactory prime mover 10 is one using a skid steer principle where the wheels of the prime mover are not steerable but the prime mover is controlled by selectively changing the relative rotational speed of the wheels 15 on opposite sides of the prime mover. Such a prime mover is disclosed in U.S. Pat. Nos. 3,319,817; 3,388,821; and 3,635,365. The prime mover 10 includes a pair of selectively raisable lift arms 16 and an attachment connector 18 selectively pivotal with respect to arms 16. The attachments 11, 12, and 14 are selectively mountable on connector 18 for operation.

Figure 3:
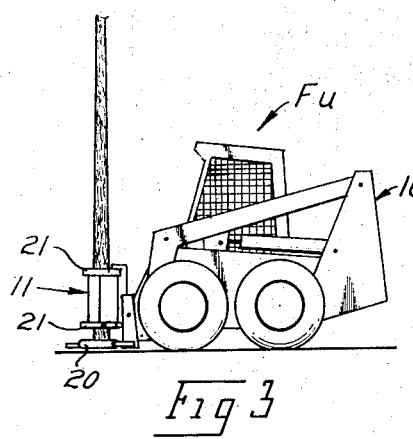
FIGS. 3 and 4 schematically illustrate the felling of the trees.
Figure 4:
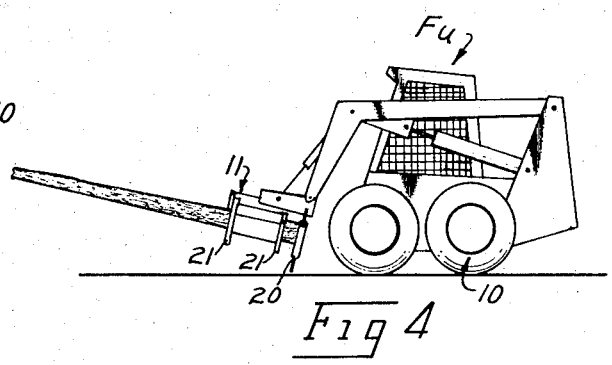

The tree shear attachment 11 includes cutting means 20 for felling a tree and closable arms 21 which selectively support such a felled tree as seen schematically in FIGS. 3 and 4. A typical form of such attachment is illustrated in U.S. Pat. No. 3,640,322.

Figure 5:
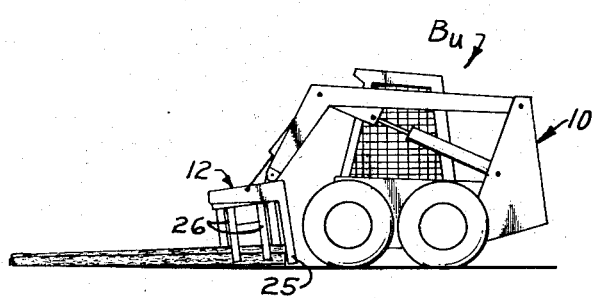
FIGS. 5 and 6 schematically illustrate the bunching operation.
Figure 6:
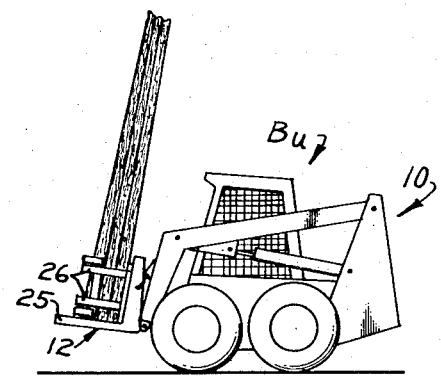

The buncher grapple attachment 12 includes an abuttment 25 and selectively closable grapple teeth 26 which selectively grasp a felled tree laying on the ground and moves it to an upright transporting position as seen schematically in FIGS. 5 and 6. A typical form of such attachment is illustrated in U.S. Pat. No. 3,439,818.

Figure 7:
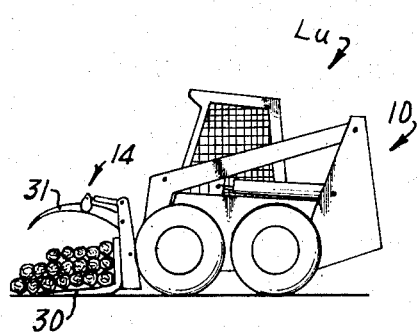
FIGS. 7 and 8 schematically illustrate the loading operation.
Figure 8:
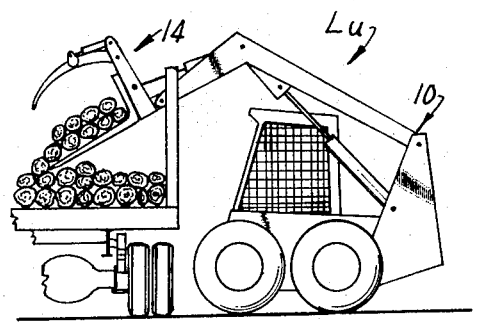

The fork grapple attachment 14 includes a pair of lifting forks 30 and a holding arm 31 to retain trees lying horizontally across the forks thereon as illustrated in FIGS. 7 and 8. This attachment is also conventional.

The attachments 11, 12 and 14 are interchangeable so that a minimum number of prime movers 10 need be used. Quick attach and detach mechanisms are available to speed the interchangeability.

Referring now to FIG. 1, it will be seen that the rows $R_1$ have been labelled A-N for clarity and rows $R_2$ have been labelled 1-30. If trees T' are removed along diagonals D, it will be seen that every other tree will be removed in each row $R_1$ and $R_2$. The trees T' to be removed or already removed in FIG. 1 have a small circle therein. The trees are felled using the prime mover 10 with the shear attachment 11 generally referred to as the felling unit FU.

The trees T' are felled by the unit FU moving generally in one direction down one diagonal D and in the opposite direction down the next adjacent diagonal D. It will also be noted that the felling operation moves generally in one direction along rows $R_1$ once the operation is started as will become apparent. While either direction may be used, movement generally from the right to the left is illustrated in FIG. 1.

For sake of brevity, the felling operation will be described for diagonals labelled specifically $D_1$–$D_4$ and rows B–F. As the felling unit FU moves along diagonal $D_1$ in the general direction $G_1$ shown, it approaches tree T' in row C lying on diagonal $D_1$. The unit FU fells this tree T' as seen in FIG. 3 and moves forwardly along path $p_1$ with the felled tree T' held in an upright traveling position. The centerline of unit FU is then aligned with the space between rows B and C with unit FU facing right and the tree T' laid down with its top directed to the right in FIG. 1 and illustrated in FIG. 4. Next unit FU is moved rearwardly along path $p_1$ until the unit can again move forwardly along diagonal $D_1$ in the direction $G_1$ to the tree T' in row B on diagonal $D_1$. This tree T' is then felled, the unit FU backed up along path $p_2$ with tree T' in an upright travelling position until it faces right and then moved to the right along path $p_3$ until the tree T' from row B can be laid on the tree T' from row C with their butt ends generally aligned whereupon tree T' from row B is laid on tree T' from row C. The movement of unit FU is reversed along paths $p_2$ and $p_3$ so that it again moves along the diagonal $D_1$ to repeat this operation.

When the felling along diagonal $D_1$ is complete, the unit FU proceeds along diagonal $D_2$ in the direction $G_2$. When the tree T' in row B on diagonal $D_2$ is reached, it is felled and the unit FU proceeds forwardly along path $p_4$ and tree T' from row B laid on trees T' from rows B and C on diagonal $D_1$ so that the butt ends align. The unit FU is reversed along path $p_4$ and then moved forwardly along diagonal $D_2$ to the tree T' in row C on diagonal $D_2$. This tree T' is felled, the unit FU is backed along path $p_5$ and then moved forwardly along path $p_6$ to lay this tree on top of the trees from rows B and C on diagonal $D_1$ and from row B on diagonal $D_2$ to form a bunching stack $S_b$ of four trees. This procedure is repeated throughout the stand.

In order to provide access to the felled trees, additional trees T'' on a diagonal $D_A$ between diagonals D are removed as indicated by circles with an X therethrough. This forms an access land AL diagonally extending through the stand at prescribed intervals. The trees T'' are laid on the bunching stacks $S_b$ already formed.

The trees T' and T'' in stacks $S_b$ are then delimbed and topped manually, usually with chain saws to form logs L. The trees in stacks $S_b$ are usually laying side by side to facilitate the delimbing and topping operation.

The prime mover 10 with the buncher grapple attachment 12 is generally indicated as a buncher unit BU and is used to move the stacks $S_b$ to the access lane AL. As seen in FIG. 5, the unit BU approaches the stacks $S_b$ from the butt end of the logs. The attachment 12 is used to bunch the logs together and grip them so that the stack $S_b$ can be lifted to a generally upright transporting position so that the weight of the stack acts through the confines of the unit BU to stabilize it. The unit BU then transports stack $S_b$ to the nearest access lane AL and lays the stack along the edge of the lane so that it is oriented generally parallel to the diagonals D. Several stacks $S_b$ are laid together to form a loading stack $S_L$, here shown as containing approximately 12 logs L. It will also be noted that the butt ends of all of the logs L in the stack $S_L$ are generally aligned. Stacks $S_L$ are made on opposite sides of access lane AL with the butt ends of the stacks $S_L$ on opposite sides facing in opposite directions to facilitate loading as will become more apparent.

The log hauling vehicle LV, illustrated as a truck, is moved along the access lane AL between the stacks $S_L$ on opposite sides thereof. The prime mover 10 with the fork grapple attachment 14 thereon and referred to generally as the loading unit LU lifts each stack $S_L$ and places it on the vehicle LV. The unit LU can be moved along the opening formed on the diagonal D adjacent the access lane AL and can approach each stack $S_L$ from outside of lane AL between the remaining trees T immediately adjacent the lane. The unit LU is shown lifting the stack $S_L$ in FIG. 7 and dumping the stack onto vehicle LV in FIG. 8.

While specific embodiments of the invention have been disclosed herein, it is to be understood that full use may be made of modifications, substitutions and equivalents without departing from the scope of the inventive concept.

We claim:

1. A tree harvesting method for selectively thinning trees from a plantation stand in which the trees are arranged in a first series of parallel rows spaced a first prescribed distance apart and in a second series of parallel rows oriented generally normal to the first series of rows and spaced a second prescribed distance apart, said method comprising the steps of:
   a. felling the trees lying along diagonals extending through the plantation stand so that alternate trees with each of the first and second series of rows are removed including the sub-steps of:
      cutting the standing tree off at its base while holding the tree in an upright position,
      moving the thusly cut tree to a position so that it can be laid between adjacent rows of the first series of parallel rows while maintaining the tree in an upright position, and
      laying the tree between the adjacent rows so that its longitudinal axis is generally parallel to the rows;
   b. delimbing and topping the felled trees to form logs; and,
   c. transporting the logs from the plantation stand.

2. The method of claim 1 wherein step (a) further includes laying a prescribed number of the cut trees between the adjacent rows to form a bunching stack with the butt ends of the trees generally aligned.

3. The method of claim 2 wherein the step of forming the bunching stack includes laying the trees cut from adjacent rows between the rows.

4. The method of claim 2 wherein step (c) includes moving the logs in the bunching stack to an upright position and transporting the bunching stack in this upright position.

5. The method of claim 4 further including forming an access lane through the timber stand oriented generally parallel to the diagonals along which the trees are felled.

6. The method of claim 5 wherein step (c) further includes laying the bunching stack being transported in an upright position along the edge of the access lane so that the longitudinal axes of the logs are generally parallel to the diagonals.

7. The method of claim 6 wherein step (c) further includes combining a plurality of bunching stacks along the edge of the access lane to form a loading stack with the butt ends of the logs therein generally aligned, and loading the loading stack onto a transport vehicle in the access lane while keeping the logs in the loading stack generally horizontal.

8. The method of claim 1 further comprising the steps of:
   d. combining the logs transported from the plantation stand into the loading stacks; and
   e. loading the loading stacks onto a transport vehicle.

9. The method of claim 8 wherein step (d) further includes forming the loading stacks by positioning certain of the logs so that the butt ends thereof are generally aligned with one end of the loading stack and positioning other logs so that the butt ends thereof are generally aligned with the opposite end of the stack.

10. The method of claim 4 further comprising the steps of:
   d. combining a prescribed number of bunching stacks transported from the plantation stand to form loading stacks; and,
   e. loading the loading stacks thus formed onto a transport vehicle.

11. The method of claim 10 wherein step (d) further includes forming the loading stack by positioning alternate bunching stacks so that the butt ends thereof are generally aligned with one end of the loading stack and by positioning the other alternate bunching stacks so that the butt ends thereof are generally aligned with the other end of the loading stack.

12. The method of claim 2 wherein said prescribed number is four trees.

13. The method of claim 10 wherein said prescribed number is three bunching stacks.

* * * * *